(12) United States Patent
Hada et al.

(10) Patent No.: US 8,776,631 B2
(45) Date of Patent: Jul. 15, 2014

(54) TRANSMISSION SHIFT FORK

(75) Inventors: Masatoshi Hada, Nagoya (JP); Hitoshi Oya, Nagoya (JP); Kentarou Nakamura, Kasugai (JP); Hiroyuki Momota, Mie (JP); Takao Mori, Kuwana (JP)

(73) Assignee: Aichi Machine Industry Co., Ltd., Nagoya-shi (JP)

( * ) Notice: Subject to any disclaimer, the term of this patent is extended or adjusted under 35 U.S.C. 154(b) by 776 days.

(21) Appl. No.: 12/968,447

(22) Filed: Dec. 15, 2010

(65) Prior Publication Data

US 2012/0011955 A1   Jan. 19, 2012

(30) Foreign Application Priority Data

Jul. 16, 2010  (JP) .................. 2010-162340

(51) Int. Cl.
*F16H 63/32* (2006.01)
*F16H 57/04* (2010.01)

(52) U.S. Cl.
CPC ............ *F16H 63/32* (2013.01); *F16H 57/0432* (2013.01); *F16H 57/0468* (2013.01)
USPC .................... 74/473.37; 74/473.36

(58) Field of Classification Search
USPC ........................ 74/473.37, 473.36
See application file for complete search history.

(56) References Cited

U.S. PATENT DOCUMENTS 3,587,783 A * 6/1971 Walters et al. ............... 184/11.1
3,915,027 A * 10/1975 Simmons et al. ............ 74/473.1
5,463,911 A * 11/1995 Knoedel et al. ............ 74/473.36
5,842,380 A * 12/1998 Bierlein et al. ............. 74/473.37
5,950,492 A * 9/1999 Crawford ..................... 74/473.3
7,581,467 B2 * 9/2009 Peterman et al. ........... 74/606 R
2008/0178700 A1  7/2008 Harmos et al.

FOREIGN PATENT DOCUMENTS

FR       2836710 A1    9/2003
JP       03-125943 U   12/1991
JP       11-247975 A    9/1999
KR       10-0792932 B1  1/2008

OTHER PUBLICATIONS

Extended European Search Report dated May 24, 2011 for the corresponding European Application No. 11000546.9.

* cited by examiner

*Primary Examiner* — David M Fenstermacher
*Assistant Examiner* — Terence Boes
(74) *Attorney, Agent, or Firm* — Global IP Counselors, LLP (57) ABSTRACT

A transmission shift fork engages with a coupling sleeve of a synchronizer and shifting the coupling sleeve. The transmission shift fork includes a first part, second part, and at least one fin. The first part is arranged to movably mount the transmission shift fork in a shift fork movement direction. The second part includes a coupling sleeve facing surface, an outwardly facing surface, and a pair of shift-direction facing surfaces. The coupling sleeve facing surface includes at least one coupling sleeve engagement part arranged to engage with an engaging groove formed on an external circumferential surface of the coupling sleeve. The outwardly facing surface includes an oil catch disposed in a position with respect to the coupling sleeve engagement part such that the oil catch captures lubricating oil and supplies to the coupling sleeve engagement part. The fin projects from inside an oil receiving recess defined by the oil catch.

10 Claims, 13 Drawing Sheets

F I G. 13

TRANSMISSION SHIFT FORK

CROSS-REFERENCE TO RELATED APPLICATIONS

This application claims priority to Japanese Patent Application No. 2010-162340, filed on Jul. 16, 2010. The entire disclosure of Japanese Patent Application No. 2010-162340 is hereby incorporated herein by reference.

BACKGROUND

1. Field of the Invention

The present invention generally relates to a transmission shift fork used in shifting a transmission equipped with the shift fork. More specifically, the present invention relates to a transmission shift fork with a heat dissipation arrangement.

2. Background Information

Some transmissions use shift forks in shifting gears of the transmission. One example of a conventional transmission shift fork is disclosed in Japanese Laid-Open Utility Model Publication No. 3-125943. In this publication, a conventional transmission shift fork is disclosed that has an oil catch. The oil catch of the conventional transmission shift fork is formed on a rear face portion of the shift fork that is on an opposite side of the shift fork from a nail portion that engages a coupling sleeve of a synchronizer. This conventional transmission shift fork is configured to supply oil caught by the oil catch to the nail portion.

SUMMARY

In this conventional transmission shift fork, the coupling sleeve rotates at a comparatively high speed relative to the transmission shift fork. Consequently, there are times when it is difficult for a sufficient amount of the oil to be supplied to the nail portion of the transmission shift fork and the nail portion incurs wear. To improve the amount of oil to be supplied to the nail portion of the transmission shift fork, it is possible to provide a through hole for allowing oil to pass from the oil catch to the nail portion. However, forming such a through hole requires machining of the transmission shift fork, and thus, forming such a through hole is disadvantageous from a cost perspective.

One object of the present disclosure is to provide a transmission shift fork with a coupling sleeve engagement part that improves the durability and/or service life of the transmission shift fork without significantly increasing cost of the transmission shift fork.

In this disclosure, a transmission shift fork is provided that is used to engage with a coupling sleeve of a synchronizer and shifting the coupling sleeve. The transmission shift fork includes a first part, second part, and at least one fin. The first part is configured and arranged to movably mount the transmission shift fork in a shift fork movement direction. The second part includes a coupling sleeve facing surface, an outwardly facing surface, and a pair of shift-direction facing surfaces disposed between the coupling sleeve facing surface and the outwardly facing surface. The coupling sleeve facing surface includes at least one coupling sleeve engagement part configured and arranged to engage with an engaging groove formed on an external circumferential surface of the coupling sleeve. The outwardly facing surface includes an oil catch disposed in a position with respect to the coupling sleeve engagement part such that the oil catch captures lubricating oil and supplies to the coupling sleeve engagement part. The fin projects from inside an oil receiving recess defined by the oil catch.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
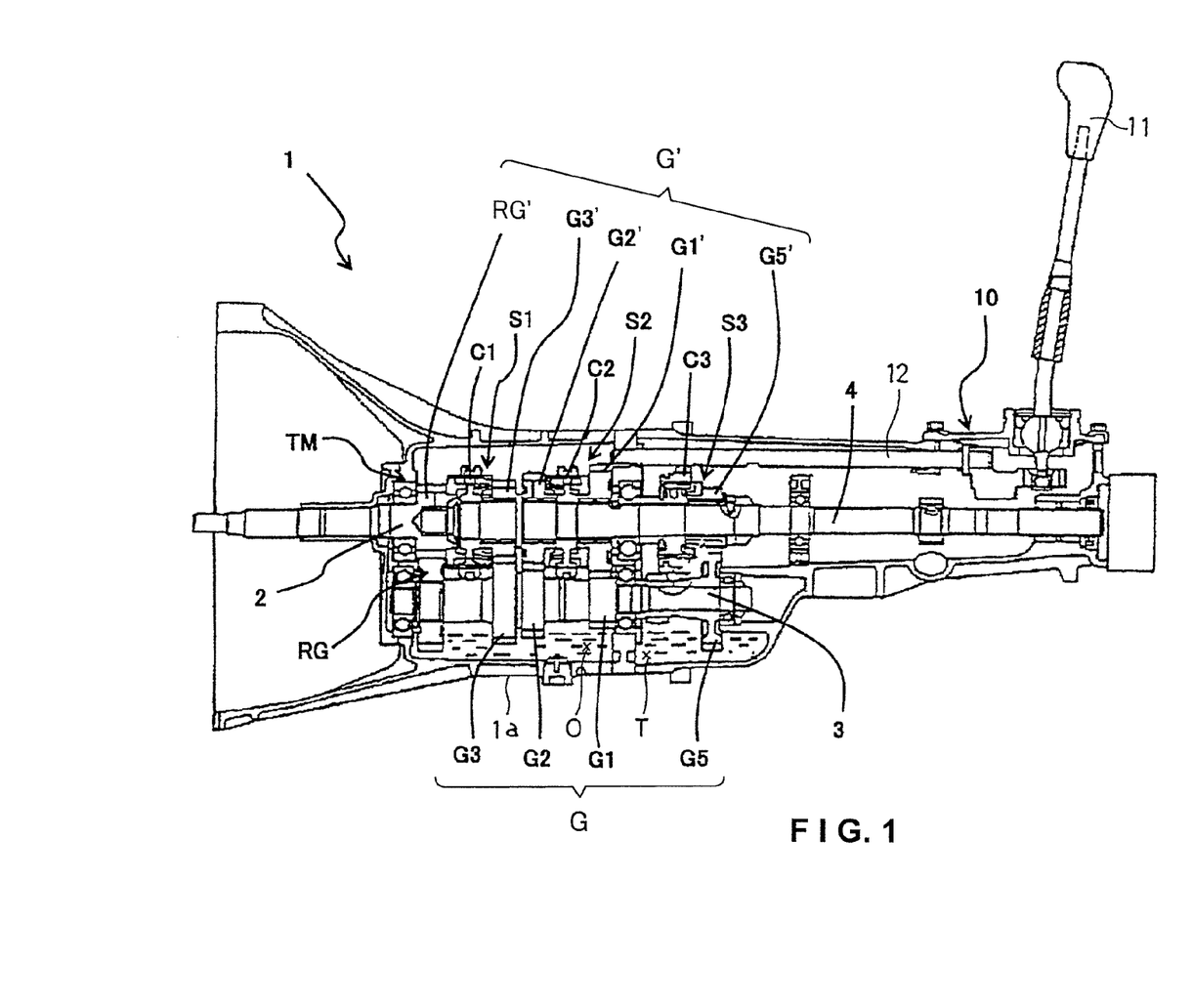
FIG. 1 is a schematic cross-sectional view of a transmission equipped with a plurality of transmission shift forks in accordance with an embodiment.

Referring initially to FIG. 1, a transmission 1 is illustrated in accordance with an illustrated embodiment. FIG. 1 is a schematic view of the transmission 1. As shown in FIG. 1, the transmission 1 basically includes an input shaft 2, a countershaft 3, an output shaft 4 and an operating device 10. The input shaft 2 is connected to a crankshaft of an engine (not shown) through a clutch (not shown). The countershaft 3 is connected to the input shaft 2 through a pair of reduction gears RG and RG'. The reduction gear RG is fixedly arranged on the countershaft 3 to rotate therewith, while the reduction gear RG' is fixedly arranged on the input shaft 2 to rotate therewith. The output shaft 4 is connected to the input shaft 2 and the countershaft 3 through a speed change gear mechanism TM. The operating device 10 is provided for operating the speed change gear mechanism TM.

By way of example, the speed change gear mechanism TM is illustrated as a well known synchromesh type speed change mechanism. In the illustrated embodiment, the speed change gear mechanism TM includes a plurality of drive gears G, a plurality of driven gears G' and a plurality of synchronizers S1 to S3. The drive gears G are fixedly arranged on the countershaft 3 to rotate therewith. The driven gears G1' are freely rotatably arranged on the output shaft 4. As seen in FIG. 1, the drive gears G include a first speed drive gear G1, a second speed drive gear G2, a third speed drive gear G3 and a fifth speed drive gear G5. In the illustrated embodiment, the driven gears G' include a first speed driven gear G1', a second speed driven gear G2', a third speed driven gear G3' and a fifth speed driven gear G5.

The driven gears GP, G2', G3' and G5' mesh with the drive gears G1, G2, G3 and G5, respectively. The synchronizers S1, S3 and S3 are arranged to synchronize the rotational speeds of the driven gears G1', G2', G3' and G5', which are normally freely rotatable on the output shaft 4, to the rotational speed of the output shaft 4. In other words, the synchronizers S1, S2 and S3 are configured and arranged to fixedly connect the driven gears GP, G2', G3' and G5', respectively, on the output shaft 4. The synchronizers S1, S2 and S3 typically have an inner-splined hub (not shown), which is splined onto the output shaft 4 next to the driven gears GP, G2', G3' and G5'. The synchronizers S1, S2 and S3 have coupling sleeves C1, C2 and C3 positioned over the inner-splined hub.

In this illustrated embodiment, the reduction gear RG' is formed integrally on a rear end of the input shaft 2. The drive gear G3 is formed integrally on the countershaft 3 in a position closer to the engine (frontward side) than the drive gears G1, G2 and G5 such that the drive gear G3 rotates as an integral unit with the countershaft 3. The drive gear G2 is formed integrally on the countershaft 3 on a rearward side of the drive gear G3 such that the drive gear G2 rotates as an integral unit with the countershaft 3. The drive gear G1 is formed integrally on the countershaft 3 on a rearward side of the drive gear G2 such that the drive gear G1 rotates as an integral unit with the countershaft 3. The drive gear G5 is fixedly arranged on a rearmost end of the countershaft 3 such that the drive gear G5 rotates as an integral unit with the countershaft 3. On the other hand, the drive gears G1', G2', G3' and G5' are arranged on the output shaft 4 such that they can rotate freely with respect to the output shaft 4 in positions corresponding to the drive gears G1, G2, G3 and G5, which are fixed to the countershaft 3.

The synchronizer S1 constitutes a third-fourth speed synchronizer that is arranged between the reduction gear RG' and the third speed driven gear G3'. The synchronizer S2 constitutes a first-second speed synchronizer that is arranged between the second speed driven gear G2' and the first speed driven gear G1'. The synchronizer S3 constitutes a fifth speed synchronizer arranged beside the fifth speed driven gear G5'.

When torque is transmitted from the first speed drive gear G1 to the output shaft 4 through the first speed driven gear G1' using the synchronizer S2, a first speed of the transmission 1 is attained. When torque is transmitted from the second speed drive gear G2 to the output shaft 4 through the second speed driven gear G2' using the synchronizer S2, a second speed of the transmission 1 is attained. When torque is transmitted from the third speed drive gear G3 to the output shaft 4 through the third speed driven gear G3' using the synchronizer S1, a third speed of the transmission 1 is attained. When torque is transmitted from the reduction gear RG' directly to the output shaft 4 using the synchronizer S1, a fourth speed of the transmission 1 is attained. When torque is transmitted from the fifth speed drive gear G5 to the output shaft 4 through the fifth speed driven gear G5' using the synchronizer S3, a fifth speed of the transmission 1 is attained.

Figure 2:
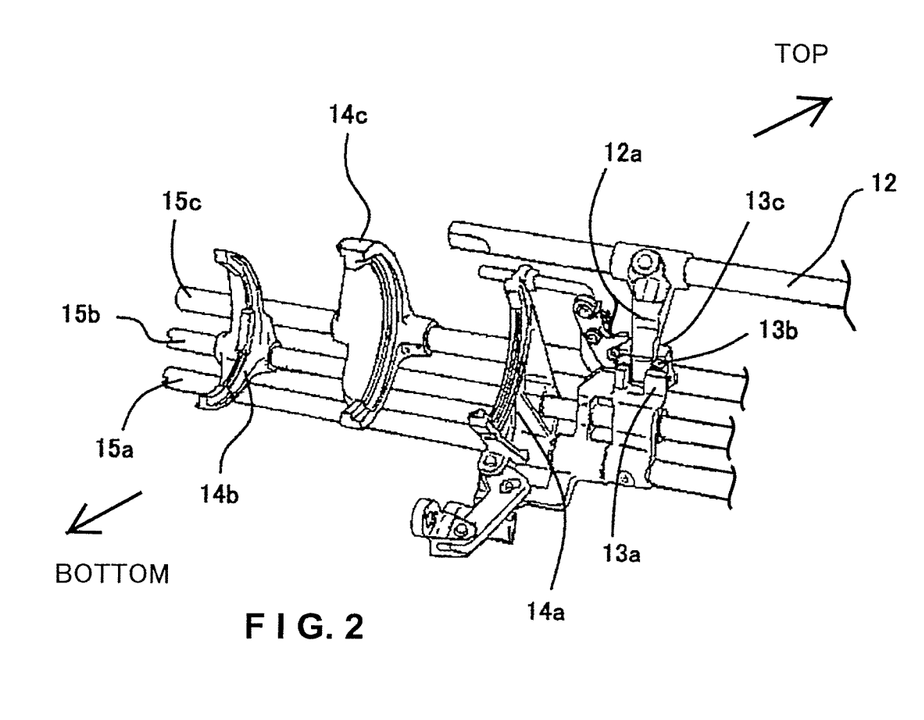
FIG. 2 is a perspective schematic view of part of an operating device for the transmission illustrated in FIG. 1 as viewed from the bottom.

FIG. 2 is a partial perspective view of part of the operating device 10 as viewed from bottom. The operating device 10 includes a shift lever 11 (FIG. 1), a striking rod 12, three fork rod brackets 13a, 13b and 13c, three shift forks 14a, 14b and 14c and three fork rods 15a, 15b and 15c. The striking rod 12 is connected to the shift lever 11. The striking rod 12 has a striking lever 12a attached thereto. The fork rod brackets 13a, 13b and 13c are attached to the fork rods 15a, 15b, and 15c, respectively. The striking lever 12a is selectively engaged with the fork rod brackets 13a, 13b and 13c to individually connect the striking rod 12 to the fork rods 15a, 15b and 15c, respectively. In other words, by moving the shift lever 11, the striking lever 12a is selectively engaged with the fork rod brackets 13a, 13b and 13c to operatively connect the striking rod 12 to the transmission shift forks 14a, 14b and 14c via the fork rods 15a, 15b and 15c, respectively. The transmission shift forks 14a, 14b and 14c are selectively engage with coupling sleeves C1, C2 and C3 of the synchronizers S1, S2 and S3, respectively.

The operation device is configured to position the fork rods 15a, 15b and 15c into different gear positions, including neutral. Gear changing is accomplished by using the shift lever 11 to operate the striking rod 12. The striking rod 12 is moved laterally so as turn the striking lever 12a. This turning of the striking lever 12a thereby selects one of the fork rods 15a, 15b and 15c. Then, moving the shift lever 11 to operate the striking rod 12 so as to move the striking lever 12a in an axial direction (shift direction, shift fork movement direction), one of the coupling sleeves C1, C2, or C3 is operated. In this embodiment, the fork rod 15a corresponds to a fifth speed fork rod. Also in this embodiment, the fork rod 15b corresponds to a third-fourth speed fork rod, and the fork rod 15c corresponds to a first-second speed fork rod. Meanwhile, the shift fork 14a corresponds to a fifth speed shift fork. Also in this embodiment, the shift fork 14b corresponds to a third-fourth speed shift fork, and the shift fork 14c corresponds to a first-second speed shift fork.

As seen in FIG. 1, the transmission 1 has a transmission case 1a. The transmission case 1a has a lower internal portion that constitutes a lubricating oil storage section T. The lubricating oil storage section T is configured to store lubricating oil O. The lubricating oil O stored in the lubricating oil storage section T serves to lubricate the speed change gear mechanism TM. More specifically, the lubricating oil O is picked up by the drive gears G1, G2, G3 and G5 and other rotating members provided on the outer circumference of the countershaft 3. In this way, the lubricating oil O is supplied to the meshing portions between the gears G1, G2, G3 and G5 and the driven gears G1', G2', G3' and G5' and the engaging portions between the coupling sleeves C1, C2 and C3 of the synchronizers S1, S2, and S3 and the transmission shift forks 14a, 14b and 14c.

Figure 3:
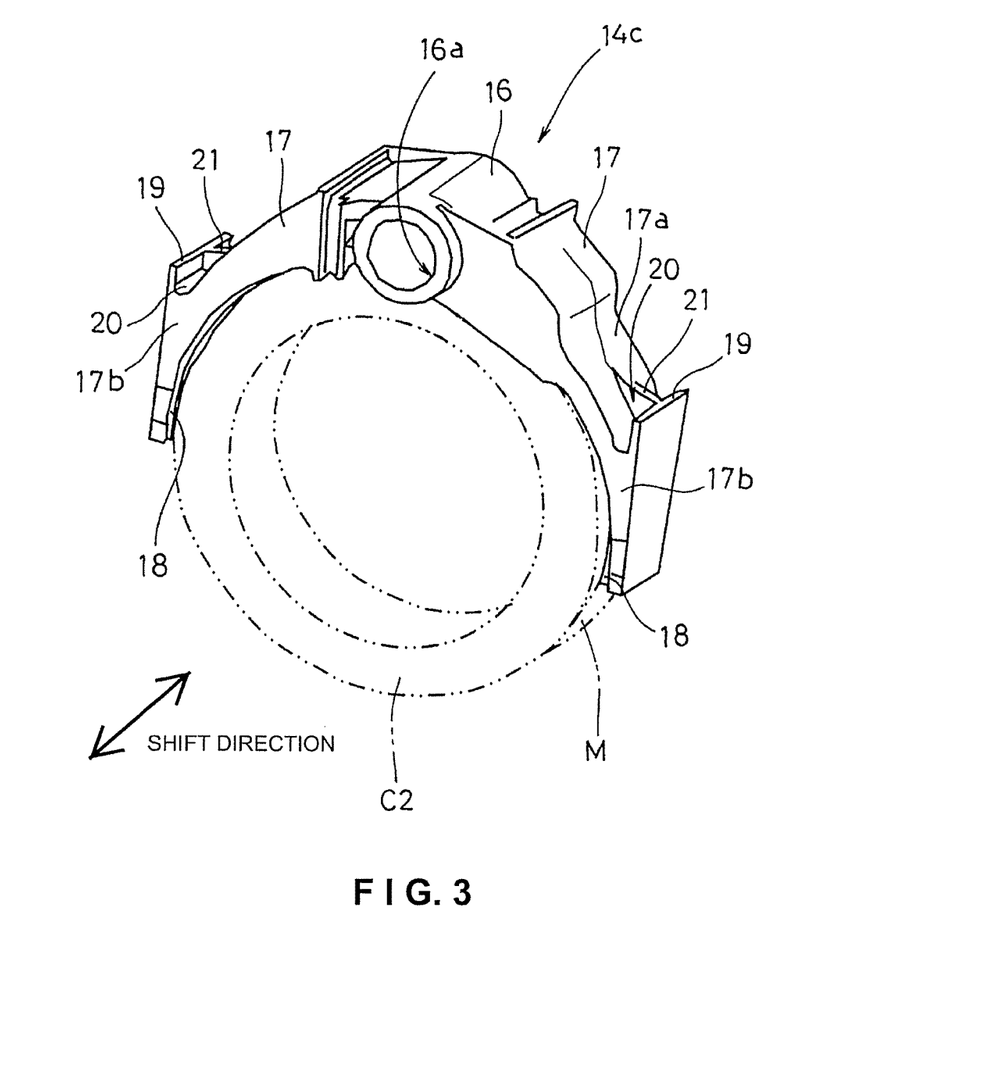
FIG. 3 is a perspective view of one of the transmission shift forks used in the transmission illustrated in FIG. 1.
Figure 4:
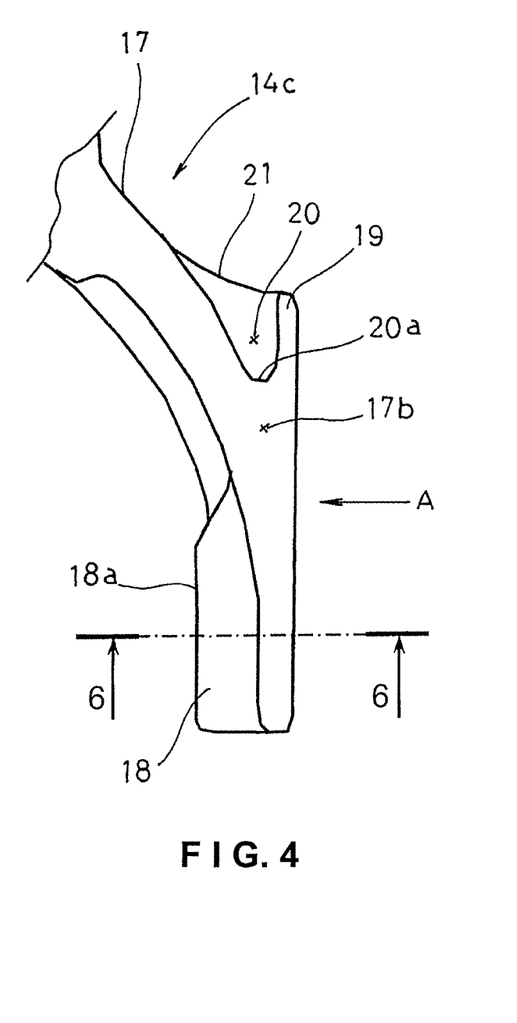
FIG. 4 is an enlarged partial side elevational view of a main portion of one of the transmission shift forks used in the transmission illustrated in FIG. 1.
Figure 5:
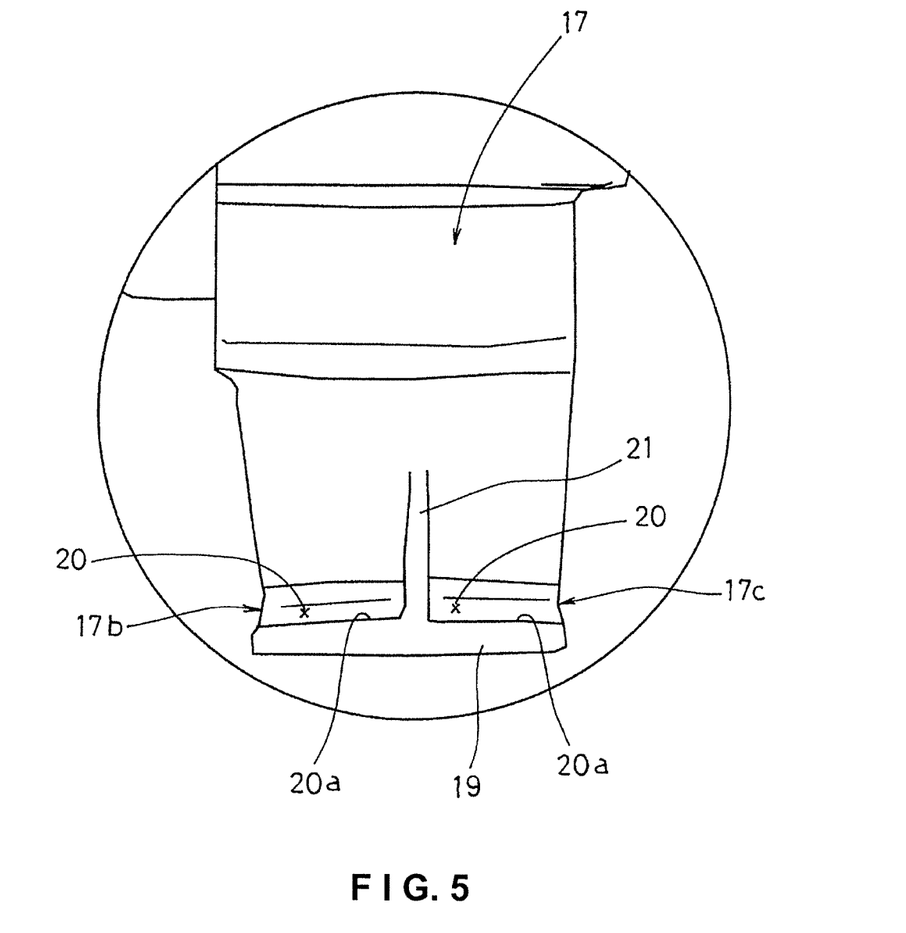
FIG. 5 is an enlarged partial plan view of the main portion of the transmission shift fork illustrated in FIG. 4.
Figure 6:
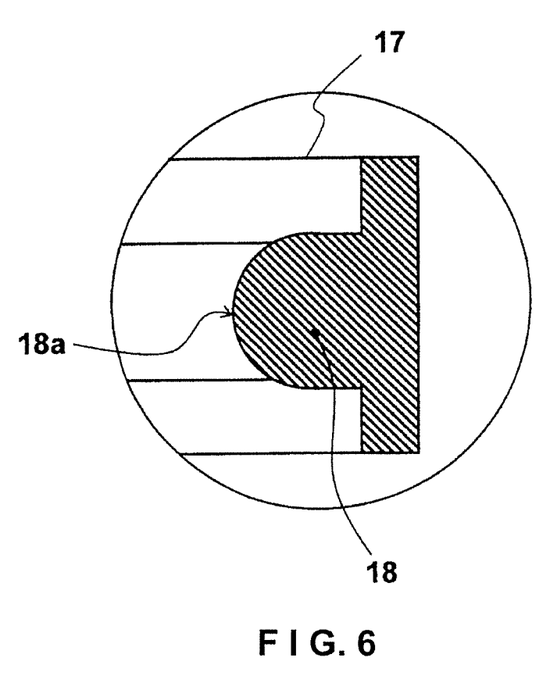
FIG. 6 is a partial cross sectional view of the main portion of the transmission shift fork illustrated in FIGS. 4 and 5 as seen along the section line 6-6 of FIG. 4.

Referring now to FIGS. 3 to 6, the shift fork 14c will now be discussed in further detail as a representative example among the transmission shift forks 14a, 14b and 14c. FIG. 3 is a perspective view of the transmission shift fork 14c. FIG. 4 is an enlarged partial side elevational view of a main portion of the transmission shift fork 14c. FIG. 5 is an enlarged partial plan view of the main portion of the transmission shift fork 14c. FIG. 6 is a partial cross sectional view the main portion of the transmission shift fork 14c illustrated in FIGS. 4 and 5 as seen along the section line 6-6 of FIG. 4.

The shift fork 14c has a boss portion 16 (a first part) and a pair of arm portions 17 (a second part). The boss portion 16 has an insertion hole 16a in which the fork rod 15c is inserted through. The arm portions 17 are formed as a one-piece integral unit with the boss portion 16 and configured to branch from the boss portion 16 in a symmetrical manner. A coupling sleeve engagement part 18 is formed integrally on an internal coupling sleeve facing surface of a tip end of each of the arm portions 17. Each of the coupling sleeve engagement parts 18 is configured to engage with an engaging groove M formed in an outer circumference of the coupling sleeve C2 of the synchronizer S2. A protruding rib 19 is formed on an outer circumferential surface of each of the arm portions 17 on an opposite side of an inside portion where the coupling sleeve engagement part 18 is formed. The portion where the protruding rib 19 is formed corresponds to a position where the coupling sleeve engagement part 18 is formed, i.e., a rear face portion of the coupling sleeve engagement part 18. The rib 19 is formed as an integral part of the arm portion 17 and stands erect along the direction of a line tangent to a slanted external surface 17a (an outwardly facing surface) forming a curved slanted shape of the arm portion 17. A recess 20 is formed by the rib 19 and the slanted external surface 17a. The recess 20 is open at both shift-direction facing end portions 17b and 17c of the arm portion 17 (FIG. 5). The recess 20 constitutes an oil catch that captures lubricating oil O that has been picked up as explained previously.

A cooling fin 21 is formed integrally inside the recess 20 such that it partitions the recess 20 into a first recess area and a second recess area in the shift direction. As shown in FIG. 5, a bottom surface 20a of the recess 20 is configured to slant downward from a position where the cooling fin is formed toward the shift-direction facing end portions 17b and 17c of the arm portion 17 such that lubricating oil O captured inside the recess 20 flows readily toward the coupling sleeve engagement part 18.

As shown in FIG. 6, each of the coupling sleeve engagement parts 18 has a contact portion 18a that contacts the engaging groove M of a coupling sleeve. The contact portion 18a has a curved contact surface configured to make it easier to supply lubricating oil O to an area between the coupling sleeve engagement parts 18 and the engaging grooves M. The shift fork 14c is a die casted member, which is cast in a split mold and a parting line formed at the mating surfaces of dies of the split mold during casting is used to form the cooling fin 21 as an integral portion of the shift fork 14c. More specifically, the split mold used to manufacture the shift fork 14c includes a pair of straight-draw operation dies with no hidden surface. In other words, all of the surfaces of the shift fork 14c facing in a separating direction of the dies can be viewed along the separating direction of the dies. Thus, there is no need to perform machining after the shift fork 14c is cast to form the cooling fin 21, and the surfaces of the shift fork 14c can be left as cast formed surfaces, which are non-machined surfaces that correspond to mold surfaces of the die. Thus, the cooling fin 21 can be established easily.

After the shift fork 14c is formed by casting, an oxide film is allowed to form on the surface of the coupling sleeve engagement part 18 naturally without any machining of the coupling sleeve engagement part 18. Thus, the surface of the coupling sleeve engagement part 18 becomes a cast formed surface on which an oxide film is formed. Since the oxide film formed on the surface provides a higher surface hardness than if the surface were machined, the service life of the coupling sleeve engagement part 18 is improved. In the other shift forks 14a and 14b, too, a shift recess (oil catch) 20 is formed by a protruding rib 19 and a cooling fin 21 is formed inside the recess 20 so as to partition the recess 20 in a shift direction.

Figure 7:
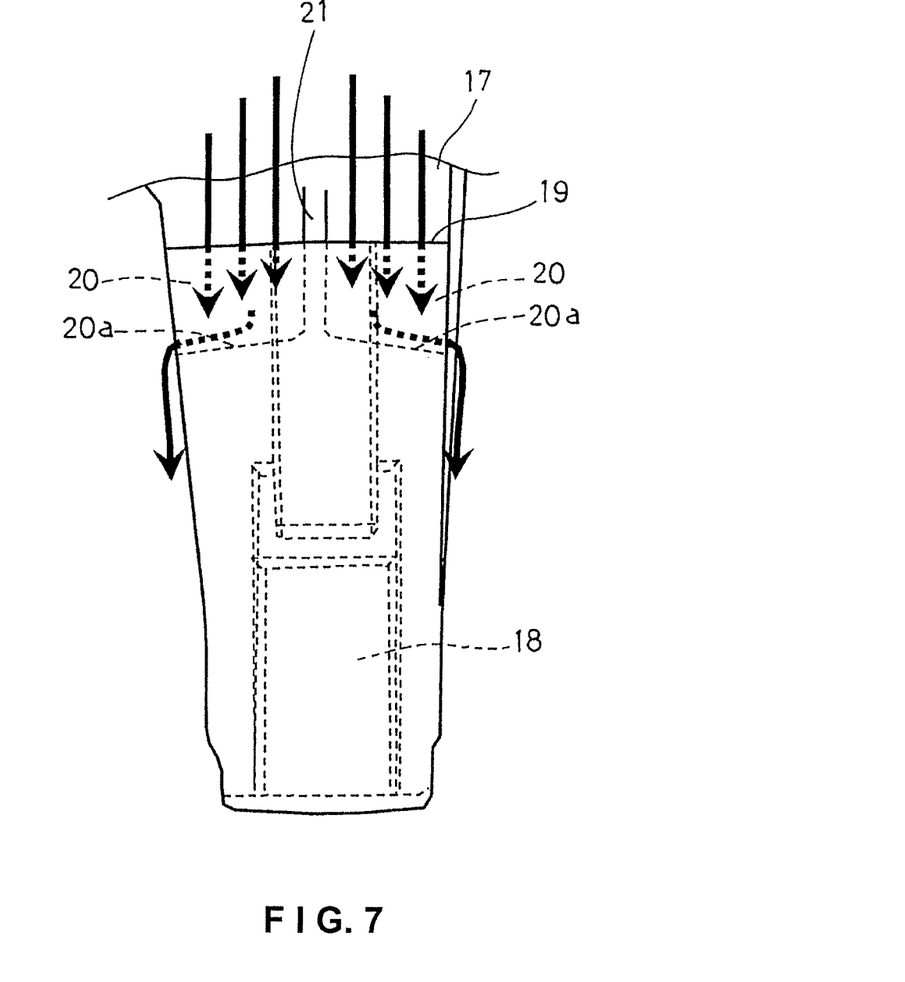
FIG. 7 is a partial sketch of the main portion of the transmission shift fork illustrated in FIGS. 4 to 6 illustrating a flow of lubricating oil flowing in the direction of arrow A shown in FIG. 4 along the main portion of the transmission shift fork.

The movement of the lubricating oil O picked up by the speed change gear mechanism TM during operation of the transmission 1 described above will now be explained. A portion of the lubricating oil O picked up and scattered by the speed change gear mechanism TM is conveyed along the slanted external surface 17a of the arm portion 17 of the shift fork 14c to the recess (oil catch) 20 or captured directly inside the recess 20. The collected lubricating oil O flows along the slanted bottom surface 20a of the recess 20 toward both of the shift-direction facing end portions 17b and 17c of the arm portion 17, passes along the shift-direction facing end portions 17b and 17c, and is supplied to the coupling sleeve engagement part 18. As a result, friction between the coupling sleeve engagement part 18 and the engaging groove M can be reduced. Additionally, since the cooling fin 21 oriented in a direction perpendicular to the shift direction is provided to span across a middle portion of the recess 20 so as to partition the recess 20 in the shift direction, the cooling fin 21 serves to push the accumulated lubricating oil O out of the recess 20 in a shift direction when the shift fork 14c moves in a shift direction. As a result, the lubricating oil O is supplied toward the coupling sleeve engagement part 18 in a reliable manner at least from the shift-direction facing end portions 17b and 17c of the shift fork 14c. Also, the cooling fin 21 accelerates cooling of the lubricating oil O and cooling of a region near the coupling sleeve engagement part 18. Moreover, a wind generated by the rotation of the first speed driven gear G1' and the second speed driven gear G2' arranged on opposite shift-direction sides of the shift fork 14c also has a cooling effect when it hits the cooling fin 21. Likewise, a wind generated by the rotation of the fifth speed driven gear G5' improves a cooling effect in the case of the shift fork 14a and a wind generated by the rotation of the third speed driven gear G3' and the reduction gear RG' improves a cooling effect in the case of the shift fork 14b.

In the transmission 1 according to the embodiment described above, the recess (oil catch) 20 is formed in each of the transmission shift forks 14a, 14b and 14c and lubricating oil O picked up by the gears can be captured inside the recess 20 effectively. Providing the cooling fin 21 serves to improve a cooling effect whereby the lubricating oil O captured in the oil catch 20 cools a region in a vicinity of the coupling sleeve engagement part 18. A wind generated by rotation of the fifth speed driven gear G5' hits the cooling fins 21 of the shift fork 14a, a wind generated by rotation of the third speed driven gear G3' and the reduction gear RG' hits the cooling fins 21 of the shift fork 14b, and a wind generated by the first speed driven gear G1' and the second speed driven gear G2' hits the cooling fins 21 of the shift fork 14c, thereby improving a cooling effect. Since the cooling fins 21 are formed utilizing a parting line formed during casting of the transmission shift forks 14a, 14b and 14c, the service life of the coupling sleeve engagement parts 18 can be improved while suppressing a manufacturing cost. Since the lubricating oil O captured in the recesses 20 is supplied to the coupling sleeve engagement parts 18, friction is reduced between the coupling sleeve engagement parts 18 and the engaging grooves M and the service life of the coupling sleeve engagement parts 18 can be improved.

With the transmission 1 according to the embodiment, since the cooling fins 21 partition the recesses 20 in the shift direction, lubricating oil O can be supplied toward the coupling sleeve engagement parts 18 in a reliable manner from both of the shift-direction facing end portions 17a and 17b of each of the transmission shift forks 14a, 14b and 14c. Since the cooling fins 21 span from the protruding ribs 19 to the slanted external surfaces 17a of the arm portions 17, a rigidity of the arm portions 17 of the transmission shift forks 14a, 14b and 14c can be improved in an opening direction.

With the transmission 1 according to the embodiment, the bottom surfaces 20a of the recesses 20 are configured to slant downward toward the shift-direction facing end portions 17b and 17c of the arm portions 17 from positions where the cooling fins 21 are provided. Consequently, lubricating oil O can be supplied to a region between the coupling sleeve engagement parts 18 and the engaging grooves M more easily. Also, since the contact portion 18a of each of the coupling sleeve engagement parts 18 that contacts the engaging groove M of the coupling sleeve is configured to have a curved contact surface, the lubricating oil O can be supplied to a region between the coupling sleeve engagement parts 18 and the engaging grooves M more easily.

With the transmission 1 according to the embodiment, an oxide film is allowed to form on the surface of the coupling sleeve engagement parts 18 naturally as a cast formed surface without conducting any machining of the coupling sleeve engagement parts 18 after casting. As a result, an oxide film having a higher surface hardness than can be obtained with machining is formed and the service life can be improved.

Figure 8:
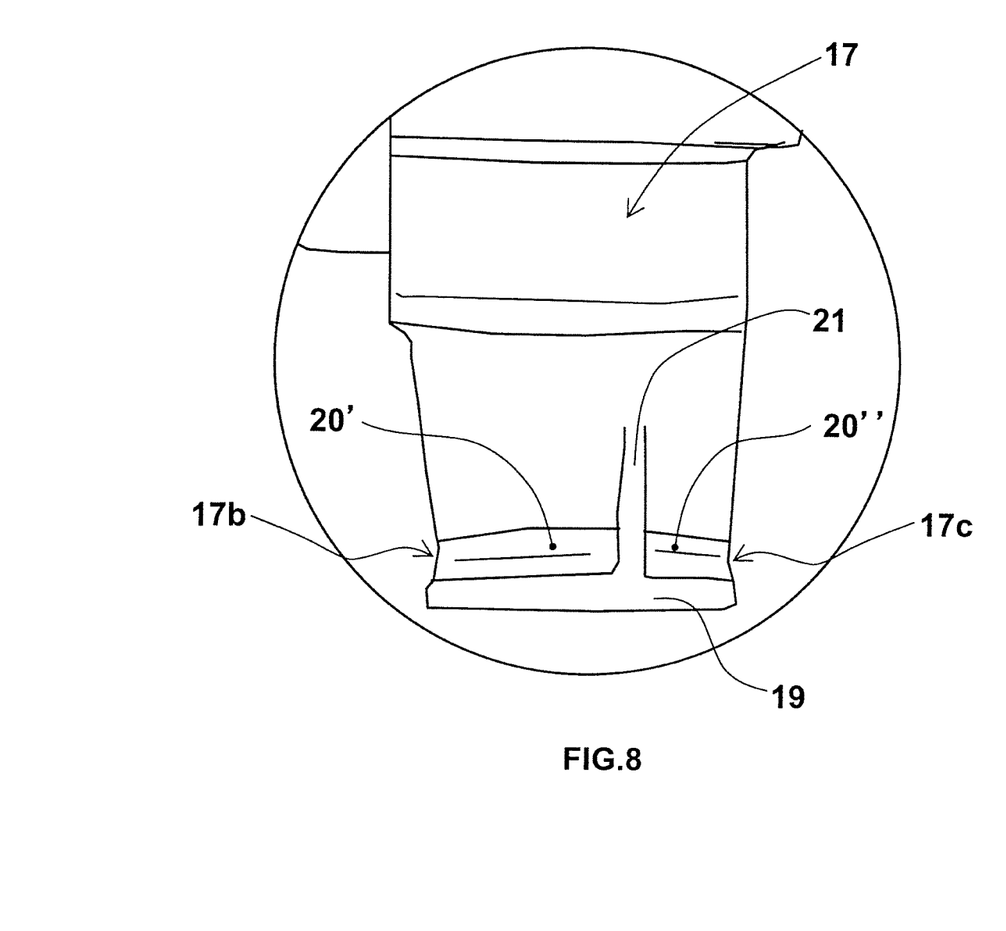
FIG. 8 is an enlarged partial plan view of a main portion of a transmission shift fork in accordance with a first modification example of the embodiment.

In the transmission shift forks 14a, 14b and 14c according to the embodiment, although the cooling fins 21 are arranged to span across a middle portion of the recesses 20 in a direction perpendicular to the shift direction so as to partition the recesses 20 in the shift direction, it is acceptable for the positions of the cooling fins 21 to be shifted away from the middle in either side of the shift direction. For example, as a first modification example shown in FIG. 8, it is acceptable to arrange the cooling fins 21 such that portions of recesses 20' located on the sides of the transmission shift forks 14a, 14b and 14c that are closer to the higher speed gears, i.e., the fifth speed driven gear G5', the reduction gear RG', and the second speed driven gear G2', are larger than portions of recesses 20" located on the sides of the transmission shift forks 14a, 14b and 14c that are closer to the lower speed gears, i.e., the third speed driven gear G3' and the first speed driven gear G1'. In this way, a sufficient amount of lubricating oil O can be supplied not only to the coupling sleeve engagement parts 18 facing toward the higher-speed fifth speed driven gear $G5^1$, reduction gear RG', and second speed driven gear G2' but also to synchronizing parts, e.g., balk rings and clutch gears, arranged on the side where the higher-speed fifth speed driven gear G5', reduction gear RG', and second speed driven gear G2' are arranged.

Figure 9:
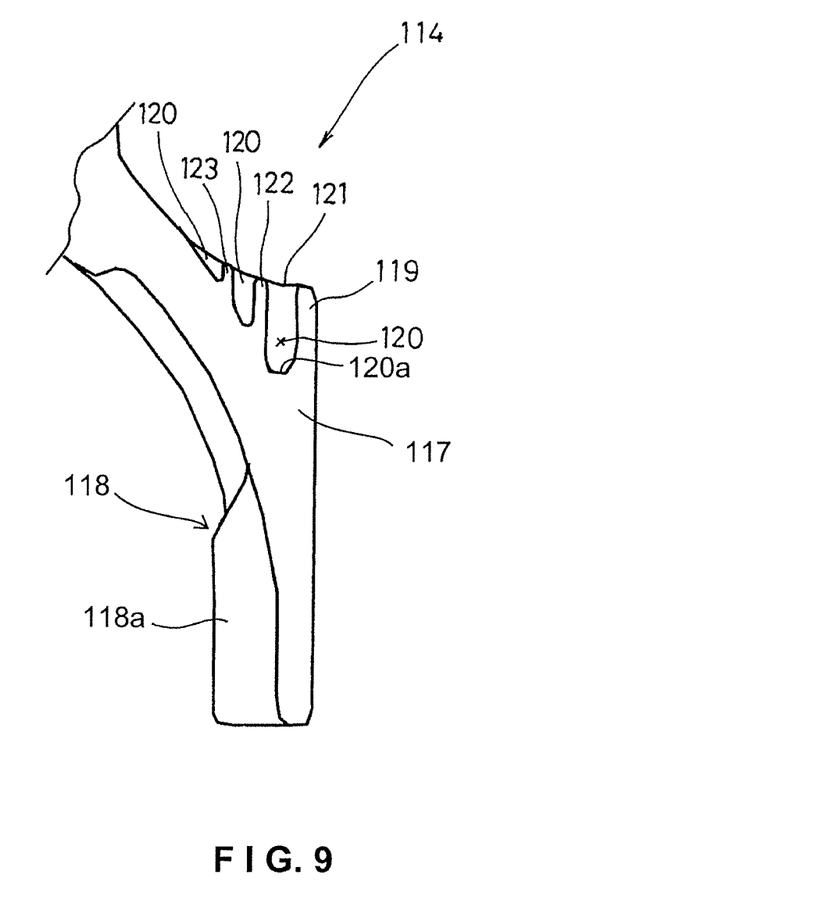
FIG. 9 is an enlarged partial side elevational view of a main portion of a transmission shift fork in accordance with a second modification example of the embodiment.
Figure 10:
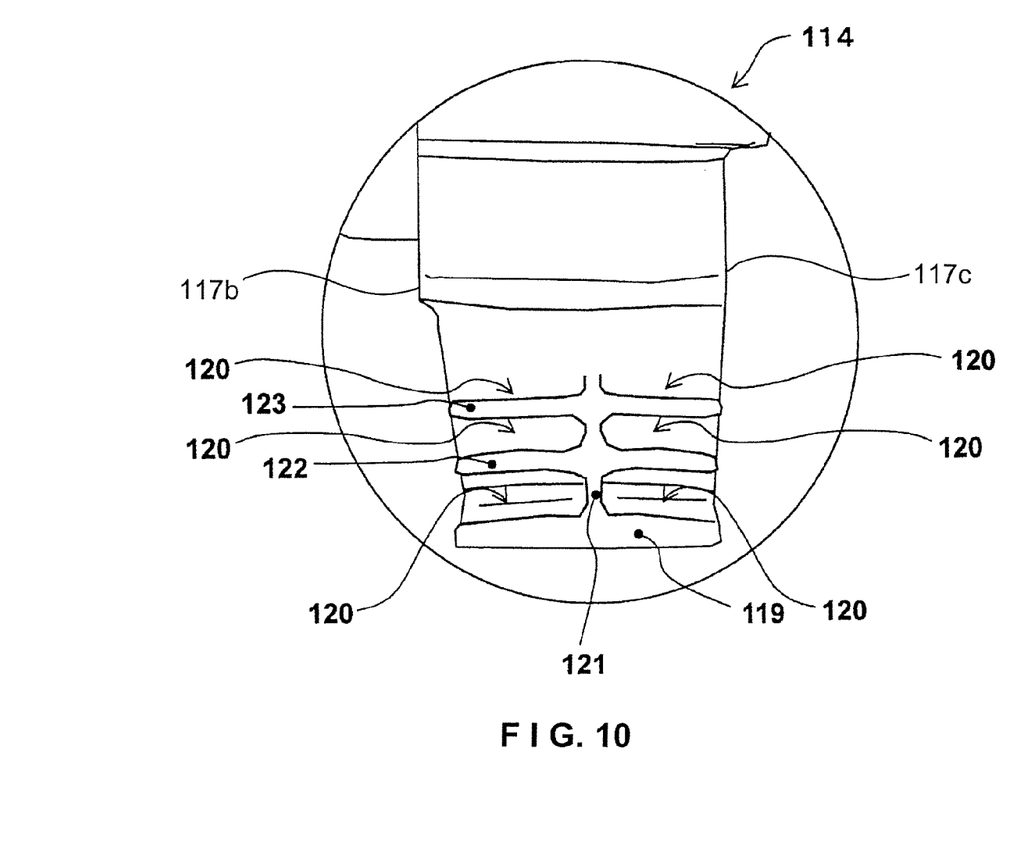
FIG. 10 is an enlarged partial plan view of the main portion of the transmission shift fork illustrated in FIG. 9.

In the transmission shift forks 14a, 14b and 14c of the embodiment described above, the cooling fins 21 are single fins that are formed as integral portions of the transmission shift forks, arranged to extend perpendicularly from the ribs 19, and configured to span continuously to the slanted external surface 17a of the arm portion 17. However, as shown in FIGS. 9 and 10 illustrating a shift fork 114 according to a second modification example of the embodiment, it is also acceptable to provide cooling fins 121 and additional cooling fins 122 and 123 (subordinate fins) that extend from the cooling fins 121 so as to be substantially parallel to a protruding rib 119. With this example, each of the recesses 120 is divided by the cooling fin 121 into portions separated in the shift direction and further divided by the cooling fins 122 and 123 that are oriented along the shift direction. In this example, too, the cooling fins 121 can be formed utilizing a partition line formed during casting and the cooling fins 122 and 123 can be formed as integral portions during casting. Thus, a plurality of the cooling fins 121, 122 and 123 can be established easily. Furthermore, a cooling effect can be improved greatly by having a plurality of the cooling fins 121, 122 and 123.

Figure 11:
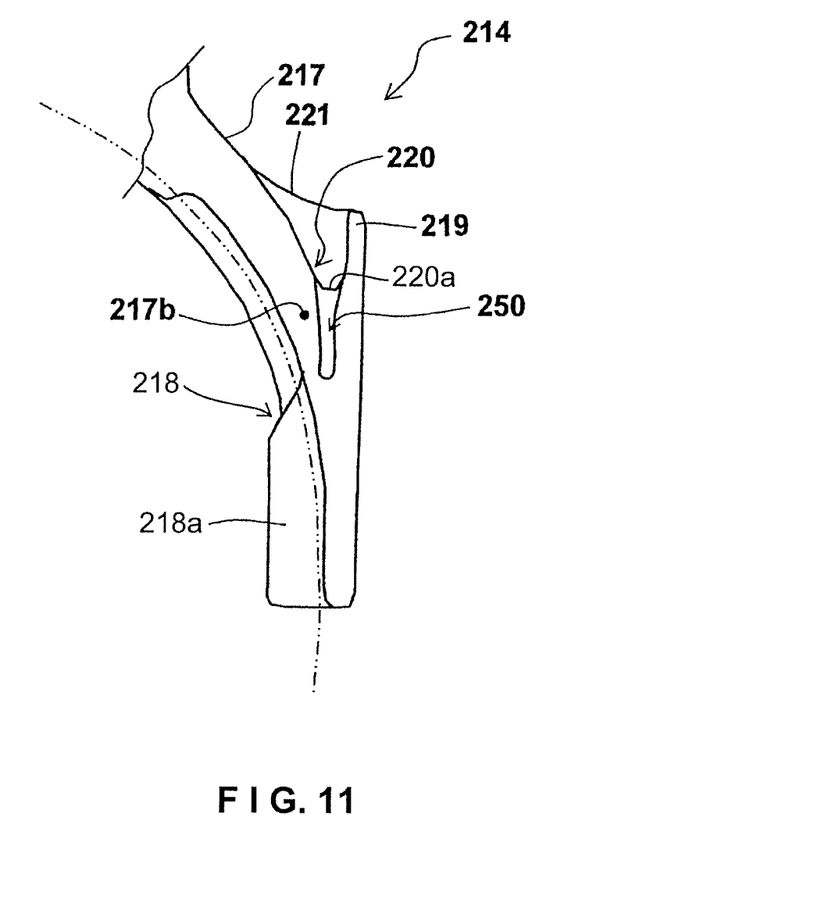
FIG. 11 is an enlarged partial side elevational view of a main portion of a transmission shift fork in accordance with a third modification example of the embodiment.
Figure 12:
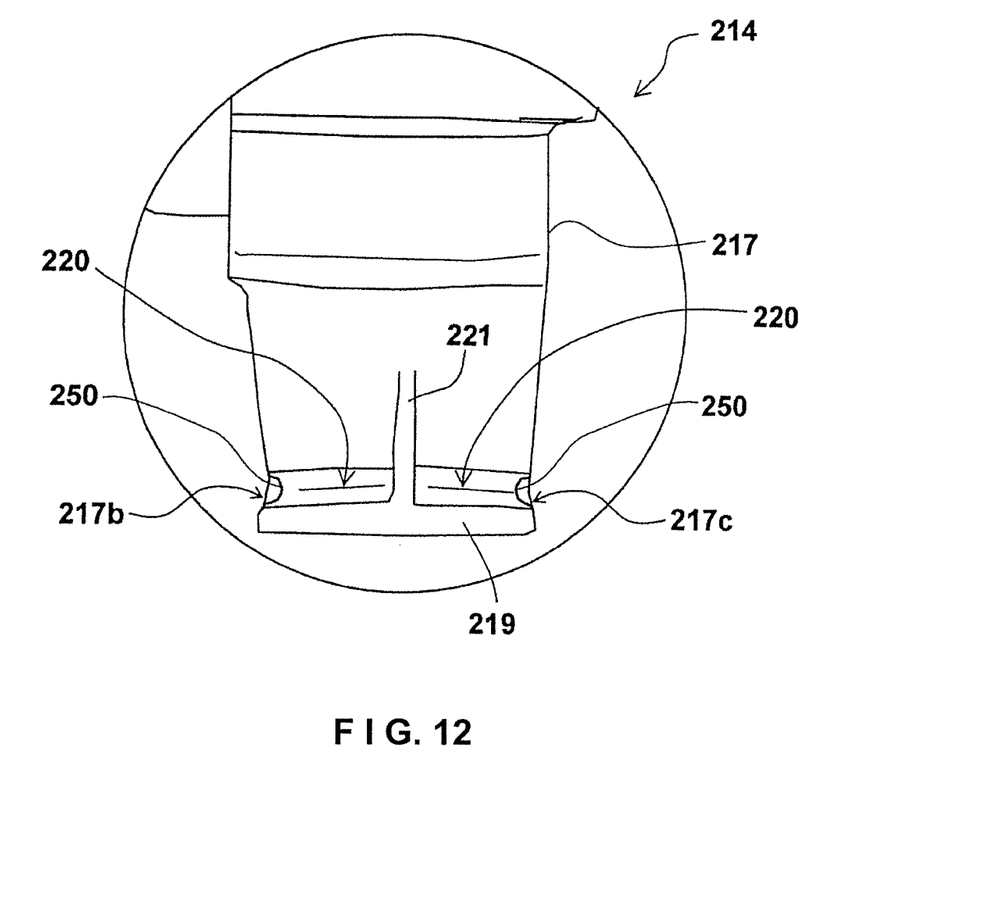
FIG. 12 is an enlarged partial plan view of the main portion of the transmission shift fork illustrated in FIG. 11.
Figure 13:
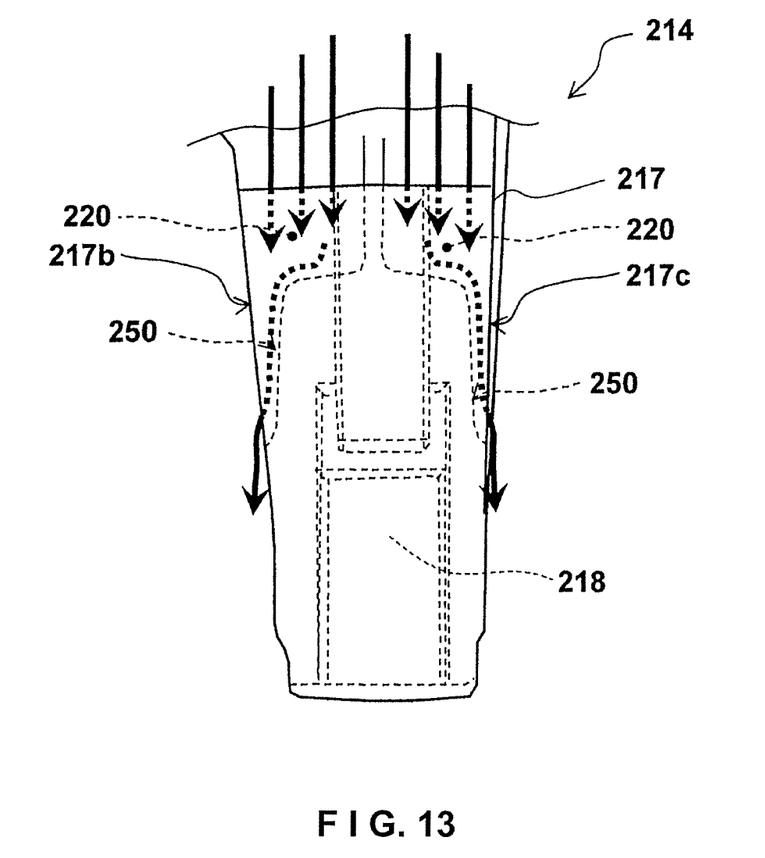
FIG. 13 is a partial sketch, similar to FIG. 7, of the main portion of the transmission shift fork illustrated in FIGS. 11 and 12 illustrating a flow of lubricating oil flowing along the main portion of the transmission shift fork.

With the transmission shift forks 14a, 14b and 14c of the embodiment described above, lubricating oil O captured in the recesses 20 flows toward both shift-direction facing end portions 17b and 17c of the arm portions 17, passes along the shift-direction facing end portions 17b and 17c, and is supplied to the coupling sleeve engagement parts 18. However, as shown in FIGS. 11, 12, and 13 illustrating a shift fork 214 according to a third modification example of the embodiment, it is acceptable to form a recessed groove 250 in one of or each of shift-direction facing end portions 217b and 217c of an arm portion 217, the recessed groove 250 communicates with the recess 220 and extends toward a tip end of the arm portion 217 such that lubricating oil O captured in the recess 220 is guided by the recessed groove 250 to a vicinity of a coupling sleeve engagement part 218. In this way, the lubricating oil can be supplied reliably to the coupling sleeve engagement part 218.

In the transmission shift fork disclosed herein, the oil catch is formed on the outwardly facing surface of the transmission shift fork in a position with respect to the coupling sleeve engagement part such that the oil catch captures lubricating oil and supplies to the coupling sleeve engagement part such that the oil catch captures lubricating oil and supplies to the coupling sleeve engagement part and at least one fin projects from inside an oil receiving recess defined by the oil catch. The projecting fin improves a cooling effect whereby the lubricating oil captured in the oil catch cools a region in a vicinity of the coupling sleeve engagement part. A wind generated by rotation of a gear arranged on a shift direction side of the shift fork also serves to improve the cooling effect by contacting the fin. Thus, by merely providing a fin, the service life of the coupling sleeve engagement part can be improved while suppressing a cost increase. Since the oil captured by the oil catch is supplied to the coupling sleeve engagement part, friction is reduced between the coupling sleeve engagement part of the shift fork and the engaging groove of the coupling sleeve and the service life of the coupling sleeve engagement part can be improved.

In the transmission shift fork of the illustrated embodiments, the oil catch may be defined by a protruding rib protruding from the outwardly facing surface of the transmission shift fork, with the oil receiving recess being open at both of the shift-direction facing surfaces of the transmission shift fork. The at least one fin partitions the oil receiving recess into a first recess area and a second recess area with the first and second recess areas opened to a corresponding one of the shift-direction facing surfaces of the transmission shift fork, respectively. In this way, the oil catch can be established in a simple fashion and lubricating oil can be supplied toward the coupling sleeve engagement part in a reliable fashion from both shift-direction facing end portions of the shift fork.

In the transmission of the illustrated embodiments, the at least one fin may be provided in such a position such that the second recess area has larger oil volume capturing capacity than an oil volume capturing capacity of the first recess area. With such a configuration, since a larger amount of lubricating oil can be supplied from the second recess area than from the first recess area, a sufficient amount of lubricating oil can be supplied to a synchronization part, e.g., a balk ring or a clutch gear, located on a side where a gear having a high rotational speed is located as well as to the coupling sleeve engagement part by forming the second recess area on the side where the gear having a high rotational speed is located.

In the transmission shift fork of the illustrated embodiments, the transmission shift fork may be integrally casted as a one-piece die casted member with the at least one fin being disposed along a die parting line on the outwardly facing surface.

In the transmission shift fork of the illustrated embodiments, the coupling sleeve engagement part may include a cast formed surface with an oxide film disposed on the cast formed surface. In this way, the service life of the coupling sleeve engagement part can be increased because an oxide film having a higher surface hardness than a machined surface is formed on the surface of the coupling sleeve engagement part.

In the transmission shift fork of the illustrated embodiments, the coupling sleeve engagement part may include a curved contact surface that is disposed where the coupling sleeve engagement part contacts the engaging groove. With such a configuration, lubricating oil can be supplied more readily between the coupling sleeve engagement part of the shift fork and the engaging groove of the coupling sleeve.

In the transmission shift fork of the illustrated embodiments, the oil receiving recess may include a bottom surface that slants away from the at least one fin towards both of the shift-direction facing surfaces with the bottom surface approaching closer to the coupling sleeve engagement part as the bottom surface approaches the shift-direction facing surfaces. With such a configuration, lubricating oil can be supplied even more readily between the coupling sleeve engagement part of the shift fork and the engaging groove of the coupling sleeve.

In the transmission shift fork of the illustrated embodiments, a subordinate fin may be provided that projects from the oil catch and extending along the outwardly facing surface in the shift fork movement direction from the at least one fin. In this way, the cooling effect with respect to a vicinity of the coupling sleeve engagement part can be improved.

In the transmission shift fork of the illustrated embodiments, the oil catch may further include a recessed groove formed on at least one of the shift-direction facing end portions with the recessed groove communicating with the oil receiving recess and extending toward a tip end of the second part. In this way, the lubricating oil can be supplied reliably to the coupling sleeve engagement part.

With a transmission according of the illustrated embodiments, gear changing is accomplished by shifting a coupling sleeve with a shift fork as described above.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. It is not necessary for all advantages to be present in a particular embodiment at the same time. Every feature which is unique from the prior art, alone or in combination with other features, also should be considered a separate description of further inventions, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A transmission shift fork for engaging with a coupling sleeve of a synchronizer and shifting the coupling sleeve, the transmission shift fork comprising:
    a first part configured and arranged to movably mount the transmission shift fork in a shift fork movement direction; and
    a second part including a coupling sleeve facing surface, an outwardly facing surface, and a pair of shift-direction facing surfaces disposed between the coupling sleeve facing surface and the outwardly facing surface, the coupling sleeve facing surface including at least one coupling sleeve engagement part configured and arranged to engage with an engaging groove formed on an external circumferential surface of the coupling sleeve, the outwardly facing surface including an oil catch disposed in a position with respect to the coupling sleeve engagement part such that the oil catch captures lubricating oil and supplies to the coupling sleeve engagement part; and
    at least one fin projecting from inside an oil receiving recess defined by the oil catch, wherein
    the oil catch being defined by a protruding rib having a base end portion connected to the outwardly facing surface of the transmission shift fork and a free end portion with the protruding rib protruding from the base end portion to the free end portion, with the oil receiving recess being open at both of the shift-direction facing surfaces of the transmission shift fork.

2. The transmission shift fork according to claim 1, wherein
    the at least one fin partitions the oil receiving recess into a first recess area and a second recess area with the first and second recess areas opened to a corresponding one of the shift-direction facing surfaces of the transmission shift fork, respectively.

3. The transmission shift fork according to claim 2, wherein
    the at least one fin is provided in such a position such that the second recess area has larger oil volume capturing capacity than an oil volume capturing capacity of the first recess area.

4. The transmission shift fork according to claim 2, further comprising
    a subordinate fin projecting from the oil catch and extending along the outwardly facing surface in the shift fork movement direction from the at least one fin.

5. The transmission shift fork according to claim 1, wherein
    the first and second parts are integrally casted as a one-piece die casted member with the at least one fin being disposed along a die parting line on the outwardly facing surface.

6. The transmission shift fork according to claim 5, wherein
    the coupling sleeve engagement part includes a cast formed surface with an oxide film disposed on the cast formed surface.

7. The transmission shift fork according to claim 1, wherein
    the coupling sleeve engagement part includes a curved contact surface that is disposed where the coupling sleeve engagement part contacts the engaging groove.

8. The transmission shift fork according to claim 1, wherein the oil receiving recess includes a bottom surface that slants away from the at least one fin towards both of the shift-direction facing surfaces with the bottom surface approaching closer to the coupling sleeve engagement part as the bottom surface approaches the shift-direction facing surfaces.

9. The transmission shift fork according to claim 1, wherein the oil catch further includes a recessed groove formed on at least one of the shift-direction facing end portions with the recessed groove communicating with the oil receiving recess and extending toward a tip end of the second part.

10. A transmission comprising:

the transmission shift fork according to claim 1; and a plurality of gears and a shift lever mechanically connected to the transmission shift fork to shift the coupling sleeve in response to an operation of the shift lever.

* * * * *